United States Patent [19]

Hattey et al.

[11] Patent Number: 5,408,680
[45] Date of Patent: Apr. 18, 1995

[54] SINGLE CHANNEL AUTONOMOUS DIGITALLY TRUNKED RF COMMUNICATIONS SYSTEM

[75] Inventors: David L. Hattey, Lynchburg; Marc A. Dissosway, Forest; Samuel Maedjaja; Houston H. Hughes, III, both of Lynchburg, all of Va.; Jeffrey S. Childress, Delafield, Wis.

[73] Assignee: Ericsson GE Mobile Communications Inc., Research Triangle Park, N.C.

[21] Appl. No.: 927,860

[22] Filed: Aug. 11, 1992

[51] Int. Cl.$^6$ .................................. H04B 7/14
[52] U.S. Cl. .................... 455/15; 455/34.1; 455/56.1; 370/95.3
[58] Field of Search .......................... 455/8-9, 455/11.1, 15, 16, 17, 19, 34.1, 34.2, 54.1, 54.2, 56.1, 62; 370/95.1, 95.3

[56] References Cited

U.S. PATENT DOCUMENTS

| | | |
|---|---|---|
| 3,292,178 | 12/1966 | Magnuski . |
| 3,458,664 | 7/1969 | Adlhoch et al. . |
| 3,571,519 | 3/1971 | Tsimbidis . |
| 3,801,956 | 4/1974 | Braun et al. . |
| 3,898,390 | 8/1975 | Wells et al. . |
| 3,906,166 | 9/1975 | Cooper et al. . |
| 3,936,616 | 2/1976 | DiGianfilippo et al. . |
| 3,969,210 | 10/1976 | Peterson et al. . |
| 3,970,801 | 11/1976 | Ross et al. . |
| 4,001,693 | 2/1977 | Stackhouse et al. . |
| 4,010,327 | 3/1977 | Kobrinetz . |
| 4,012,597 | 3/1977 | Lynk, Jr. et al. . |
| 4,022,973 | 5/1977 | Stackhouse . |
| 4,027,243 | 5/1977 | Stackhouse et al. . |
| 4,029,901 | 6/1977 | Campbell . |
| 4,128,740 | 12/1978 | Graziano . |
| 4,131,849 | 12/1978 | Freeburg et al. . |
| 4,184,118 | 1/1980 | Cannalte et al. . |
| 4,231,114 | 10/1980 | Dolikian . |
| 4,267,593 | 5/1981 | Craiglow . |
| 4,309,772 | 1/1982 | Kloker et al. . |
| 4,312,070 | 1/1982 | Coombes et al. . |
| 4,312,074 | 1/1982 | Pautler et al. . |
| 4,322,576 | 3/1982 | Miller . |
| 4,326,264 | 4/1982 | Cohen et al. . |
| 4,339,823 | 7/1982 | Predina et al. . |
| 4,347,625 | 8/1982 | Williams . |
| 4,360,927 | 11/1982 | Bowen et al. . |
| 4,369,443 | 1/1983 | Giallanza et al. . |
| 4,382,298 | 5/1983 | Evans . |
| 4,392,242 | 7/1983 | Kai . |
| 4,400,585 | 8/1983 | Kamen et al. . |
| 4,409,687 | 10/1983 | Berti et al. . |
| 4,418,425 | 11/1983 | Fennel, Jr. et al. . |
| 4,430,742 | 2/1984 | Milleker et al. . |
| 4,430,755 | 2/1984 | Nadir et al. . |
| 4,433,256 | 2/1984 | Dolikian . |
| 4,434,323 | 2/1984 | Levine et al. . |
| 4,450,573 | 5/1984 | Noble . |
| 4,485,486 | 11/1984 | Webb et al. . |
| 4,534,061 | 8/1985 | Ulug . |
| 4,553,262 | 11/1985 | Coe ..................................... 455/17 |
| 4,578,815 | 3/1986 | Persinotti . |
| 4,649,567 | 3/1987 | Childress . |
| 4,658,435 | 4/1987 | Childress et al. . |
| 4,663,765 | 5/1987 | Sutphin . |
| 4,695,473 | 9/1987 | Etoh . |

(List continued on next page.)

FOREIGN PATENT DOCUMENTS

0102836 5/1986 Japan .

Primary Examiner—Reinhard J. Eisenzopf
Assistant Examiner—Andrew Faile
Attorney, Agent, or Firm—Nixon & Vanderhye

[57] ABSTRACT

A single channel autonomous trunking ("SCAT") RF repeater transmits and receives on a single duplex RF channel. The repeater operates alternately in a control channel mode and in an assigned channel mode. Digital control channel signalling results in temporary assignment of the single channel for assigned channel signalling (e.g., mobile generated messages). A holdover time period following reversion of the channel to control channel signalling minimizes collisions and permits priority to be given to emergency communications. Low speed data subaudible digital signalling may be used to provide late entry capabilities.

15 Claims, 5 Drawing Sheets

U.S. PATENT DOCUMENTS

| | | |
|---|---|---|
| 4,698,805 | 10/1987 | Sasuta et al. . |
| 4,716,407 | 12/1987 | Borras et al. . |
| 4,723,264 | 2/1988 | Sasuta et al. . |
| 4,757,536 | 7/1988 | Szczutkowski . |
| 4,771,448 | 9/1988 | Koohgoli . |
| 4,811,420 | 3/1989 | Avis et al. . |
| 5,125,102 | 6/1992 | Childress et al. .................. 455/54.1 |
| 5,159,701 | 10/1992 | Barnes et al. ......................... 455/15 |
| 5,175,866 | 12/1992 | Childress et al. ..................... 455/16 |
| 5,235,598 | 8/1993 | Sasuta ................................. 455/34.1 |
| 5,239,678 | 8/1993 | Grube et al. ...................... 455/34.1 |
| 5,265,262 | 11/1993 | Grube et al. . |

REPEATER CONTROL STEPS

CALLING MOBILE CHANNEL Tx ACCESS

FIG. 5
MOBILE RECEIVE MODE

SINGLE CHANNEL AUTONOMOUS DIGITALLY TRUNKED RF COMMUNICATIONS SYSTEM

RELATED APPLICATIONS

1. Field of the Invention

The invention relates to radio frequency (RF) communications, and more particularly to trunked land-mobile RF communication systems. Still more particularly, the present invention relates to a single channel autonomous trunked ("SCAT") radio communications system.

2. Background and Summary of the Invention

Land-mobile RF communications systems are commonly categorized as being either "conventional" or "trunked". In a so-called "conventional" RF communications system, full-duplex RF repeaters are directly accessed by mobile radios that transmit on the particular repeater input frequency in order to cause the repeater to repeat the mobile transmission on its output frequency. In such "conventional" type systems, different mobile transceivers are generally programmed to operate only on a particular repeater frequency.

Although such "conventional" RF communications arrangements are relatively uncomplicated and cost-effective, they are generally incapable of insuring privacy between different groups of mobile users. Subaudible (CTCSS) signalling may be used to provide a limited "selective squelch" capability for a limited number of different user groups, but such selective squelch capability cannot adequately accommodate the number of different groups required by medium and large sized governmental entities, for example, and have no capability to call mobiles on an individual basis. Since "conventional" systems also have the disadvantage of being unable to efficiently share available RF spectrum space, it is often the case that one "conventional" repeater may be overloaded with activity while another repeater is only lightly used.

Trunked RF communications systems were developed to solve the problems exhibited by such "conventional" communications systems. In a trunked system, a plurality of duplex RF communications channels and associated RF repeaters are shared among multiple mobile transceivers. Each mobile is able to transmit on any of the plural RF channels. Some mechanism is provided for temporarily allocating channels to calling and called mobiles on a demand basis. At the conclusion of an active call, the channel in use becomes deassigned so that it is available for reassignment to other mobiles wishing to communicate.

The "trunking" mechanism mentioned above which temporarily assigns and deassigns particular RF channels to particular mobile radio users has taken many forms over the years. Early trunking systems used audio tones to "mark" channels as being busy or available. In such tone-based systems, a mobile wishing to communicate scans the repertoire of channels in search of a channel not "marked" with a busy tone. Once such a channel is located, the mobile transmits channel acquisition signals that causes the associated repeater to "mark" the channel as "busy" and to also transmit additional tone signalling calling further mobile participants in the communication. Inactive mobiles continually scan through the RF channel repertoire looking for calling tone signalling directed to them. Mobiles finding such signalling stop on the channel and unmute their audio to receive the communications. See, for example, U.S. Pat. No. 4,409,687, U.S. Pat. No. 4,360,927, U.S. Pat. No. 4,682,367, U.S. Pat. No. 4,658,435, and U.S. Pat. No. 4,649,567 (all of which are assigned to the assignee of the present application) for examples of such tone-based trunking systems.

More recent digitally trunked RF communications systems make use of a dedicated digital control channel to control trunked access to the RF channels. In such digitally trunked RF communications systems, inactive mobiles monitor a dedicated control channel carrying digital control signalling. Mobiles wishing to communicate transmit a channel request message on the inbound RF control channel. Assuming an RF channel is available for use, the repeater site responds by transmitting a channel assignment message over the outbound RF control channel. This channel assignment message specifies the unused RF channel to be used by the mobile and also typically identifies the mobiles that are to participate in the communication. The calling mobile and additional called mobiles change frequency to the unused RF channel upon receiving the outbound channel assignment message. Once the communique on the now-active RF channel is completed, the channel is "dropped" to make it available for reassignment, and the calling and called mobiles return to monitoring the RF control channel. Exemplary RF signalling protocols used to accomplish such digital trunking may be found, for example, in U.S. Pat. No. 4,905,302 to Childress et al. and U.S. Pat. No. 4,939,746 (the entire disclosures of which are incorporated herein by reference).

The following is a non-exhaustive but somewhat representative listing of prior-issued patents related to RF trunking:

| | | |
|---|---|---|
| 3,292,178 | 12/66 | Magnuski |
| 3,458,664 | 07/69 | Adlhoch et al. |
| 3,571,519 | 03/71 | Tsimbidis |
| 3,696,210 | 10/72 | Peterson et al. |
| 3,801,956 | 04/74 | Braun et al. |
| 3,898,390 | 08/75 | Wells et al. |
| 3,906,166 | 09/75 | Cooper et al. |
| 3,936,616 | 02/76 | DiGianfilippo et al. |
| 3,970,801 | 07/76 | Ross et al. |
| 4,001,693 | 05/77 | Stackhouse et al. |
| 4,010,327 | 03/77 | Kobrinetz |
| 4,012,597 | 03/77 | Lynk, Jr. et al. |
| 4,022,973 | 05/77 | Stackhouse |
| 4,027,243 | 05/77 | Stackhouse et al. |
| 4,029,901 | 06/77 | Campbell |
| 4,128,740 | 12/78 | Graziano |
| 4,131,849 | 12/78 | Freeburg et al. |
| 4,184,118 | 01/80 | Cannalte et al. |
| 4,231,114 | 10/80 | Dolikian |
| 4,267,593 | 05/81 | Craiglow |
| 4,309,772 | 01/82 | Kloker et al. |
| 4,312,070 | 01/82 | Coombes et al. |
| 4,312,074 | 01/82 | Pautler et al. |
| 4,322,576 | 03/82 | Miller |
| 4,326,264 | 04/82 | Cohen et al. |
| 4,339,823 | 07/82 | Predina et al. |
| 4,347,625 | 08/82 | Williams |
| 4,360,927 | 11/82 | Bowen et al. |
| 4,369,443 | 01/83 | Giallanza et al. |
| 4,382,298 | 05/83 | Evans |
| 4,392,242 | 07/83 | Kai |
| 4,400,585 | 08/83 | Kamen et al. |
| 4,409,687 | 10/83 | Berti et al. |
| 4,418,425 | 11/83 | Fennel, Jr. et al. |
| 4,430,742 | 02/84 | Milleker et al. |
| 4,430,755 | 02/84 | Nadir et al. |
| 4,433,256 | 02/84 | Dolikian |
| 4,434,323 | 02/84 | Levine et al. |
| 4,450,573 | 05/84 | Noble |

-continued

| | | |
|---|---|---|
| 4,485,486 | 11/84 | Webb et al. |
| 4,534,061 | 08/85 | Ulug |
| 4,578,815 | 03/86 | Persinotti |
| 4,649,567 | 03/87 | Childress |
| 4,658,435 | 04/87 | Childress et al. |
| 4,663,765 | 05/87 | Sutphin |
| 4,694,473 | 09/87 | Etoh |
| 4,698,805 | 10/87 | Sasuta et al. |
| 4,716,407 | 12/87 | Borras et al. |
| 4,723,264 | 02/88 | Sasuta et al. |
| 4,757,536 | 07/88 | Szczutkowski |
| 4,771,448 | 09/88 | Koohgoli |
| 4,811,420 | 03/89 | Avis et al. |
| 0102836 | 05/86 | Japan |

As compared to "conventional" systems, trunked RF communications systems provide more efficient usage of available RF spectrum space. Moreover, modern state of the art digitally trunked systems provide significant advantages in addition to more efficient channel utilization since they also provide a plethora of advanced features and functions (e.g., digital identification of individual and groups of mobiles, emergency and/or priority channel access, wide area "multi-site" interconnections via digital switches, etc.) not generally available in "conventional" type systems.

Low traffic area coverage issues have never been adequately addressed in state of the art digitally trunked RF communications systems. The additional cost and complexity associated with the infrastructure required to support digital RF trunking typically has not made sense for low traffic areas. In the past, to provide trunked radio coverage in low traffic areas using a digital control channel trunking approach required at a minimum two channels: one channel being the control channel and the other being the assignable channel. This approach is acceptable for customers who have access to enough channels and require such features as queueing. Due to the distributed processing "fail soft" feature provided by the assignee's EDACS system [see U.S. application Ser. No. 07/057,046 filed Jun. 3, 1987 entitled FAIL-SOFT ARCHITECTURE FOR PUBLIC TRUNKING SYSTEM such a minimal trunking system with only two channels (control channel and assigned channel) can be provided economically without large expenditures of infrastructure costs such as would be necessary if a central site controller computer were required to perform the trunking operations. Such prior art "fail soft" systems are capable of adapting to failure of a repeater operating on a dedicated digital control channel by causing a repeater formerly supporting assigned channel signalling to begin operating as the dedicated control channel repeater.

Unfortunately, RF spectrum space has become increasingly scarce as more and more service providers compete for this limited resource. In days gone by, "radio coverage" was the number one requirement for land mobile customers. With plenty of channels available, radio coverage was not a problem. Unfortunately, it did not take very long before channel allocations, especially in major cities and areas, became great issues. Channel availability, loading and channel management then became the number one restriction. Due to the scarcity of channels that are available, some customers are simply unable to obtain more than a single duplex RF channel for their low traffic areas. For such customers, a single channel system is the only feasible solution.

In the past, the only choice such customers had was to use "conventional" repeater systems for areas where low traffic justifies only a single channel allocation. Such customers had to forgo the additional flexibility and other benefits offered by a modern digitally trunked system. An even more serious problem was the incompatibility between conventional and trunked systems. Such incompatibility made it difficult to cost-effectively upgrade a conventional system to a digitally trunked system. Since mobile units designed to operate with such "conventional" systems are generally incompatible with mobile units designed to operate with digitally trunked systems, upgrading a single-channel "conventional" system to a plural channel digitally trunked system (e.g., when increased user traffic justifies additional channel allocations) becomes an extremely expensive proposition. Moreover, it was generally not possible in large radio systems having both digitally trunked and conventional sites for the digitally trunked mobiles to access the conventional repeaters.

It would be highly desirable to provide a single channel trunked RF communications system that is fully compatible with plural channel digitally trunked systems such that mobile units can be used on either the single channel or the plural channel system. It would also be highly desirable to provide such a single channel trunked RF communications system wherein the repeater site could be easily upgraded to a plural channel digitally trunked system by simply adding additional site components and without having to replace the mobiles. It would also be highly desirable to provide a single channel RF communications system that provides the flexibility and other benefits offered by state of the art digitally trunked RF communications systems.

The present invention provides a single channel autonomous trunking ("SCAT") RF communications system that offers a digitally trunked single channel solution.

To provide "trunking" communications, the preferred embodiment system provides control channel and assigned channel signalling over a single RF channel. The single channel operates alternately in a control channel mode and in an assigned channel mode, with the idle mode being the control channel mode. The preferred embodiment digital signalling present on the single channel during both control channel and assigned channel operating modes supports many of the features of a full scale plural channel digitally trunked system, and mobiles operating with the single channel system are also fully compatible with plural channel systems.

When the preferred embodiment system is idle, control channel signalling is transmitted over the single channel. When a channel request is received, a channel assignment message is sent out in a standard manner via the control channel signalling and the single channel then begins operating as an assigned channel (the channel assignment message thus assigning calling and called mobiles to the single channel). Low speed data transmitted during site operation in the assigned channel mode prevents non-called mobiles from unmuting their audio (thus providing a privacy feature despite the fact that all of the mobiles continue to monitor the single channel during assigned channel operation). The low speed data is also used for late entry and wide area scanning purposes. At the conclusion of the assigned channel communique, the single channel reverts to the control channel mode in readiness for further channel assignments.

SCAT thus offers an enhanced trunking solution to provide trunked radio coverage in difficult coverage areas with low traffic. Trunked communications, wide area tracking and roaming, Emergency and unit (individual) ID calls are just some of the advanced digitally trunked features that are available to users of the preferred embodiment SCAT system. SCAT permits public safety customers who are already part of a large network to extend their communications coverage over difficult areas (e.g., tunnels, large buildings, and shopping centers) in a cost-effective, frequency-efficient way. Because of the minimal, low maintenance configuration of a SCAT site, other users (e.g., industrial or utility customers) may also take advantage of SCAT to extend their communication coverage over low traffic areas. SCAT can also be viewed as an enhanced single channel system that provides all of the functionality of a conventional system plus advanced digital trunking features such as Emergency, multi-group privacy and individual call capabilities. The preferred embodiment SCAT system also exhibits improved performance due to its high speed (9600 baud) signalling capabilities. Conventional system customers who wish to migrate to trunking can take the first step by migrating to a SCAT system. Later upgrades to multichannel trunking do not require replacement of existing mobile units, but instead involve merely adding additional repeater hardware and reprogramming the repeater site such that one repeater operates as a dedicated control channel and additional repeater(s) operate on further channels that are available for temporary assignment.

BRIEF DESCRIPTION OF THE DRAWINGS

These and other features and advantages of the present invention will become better and more completely understood by referring to the drawings of which.

DETAILED DESCRIPTION OF A PRESENTLY PREFERRED EMBODIMENT

Figure 1:
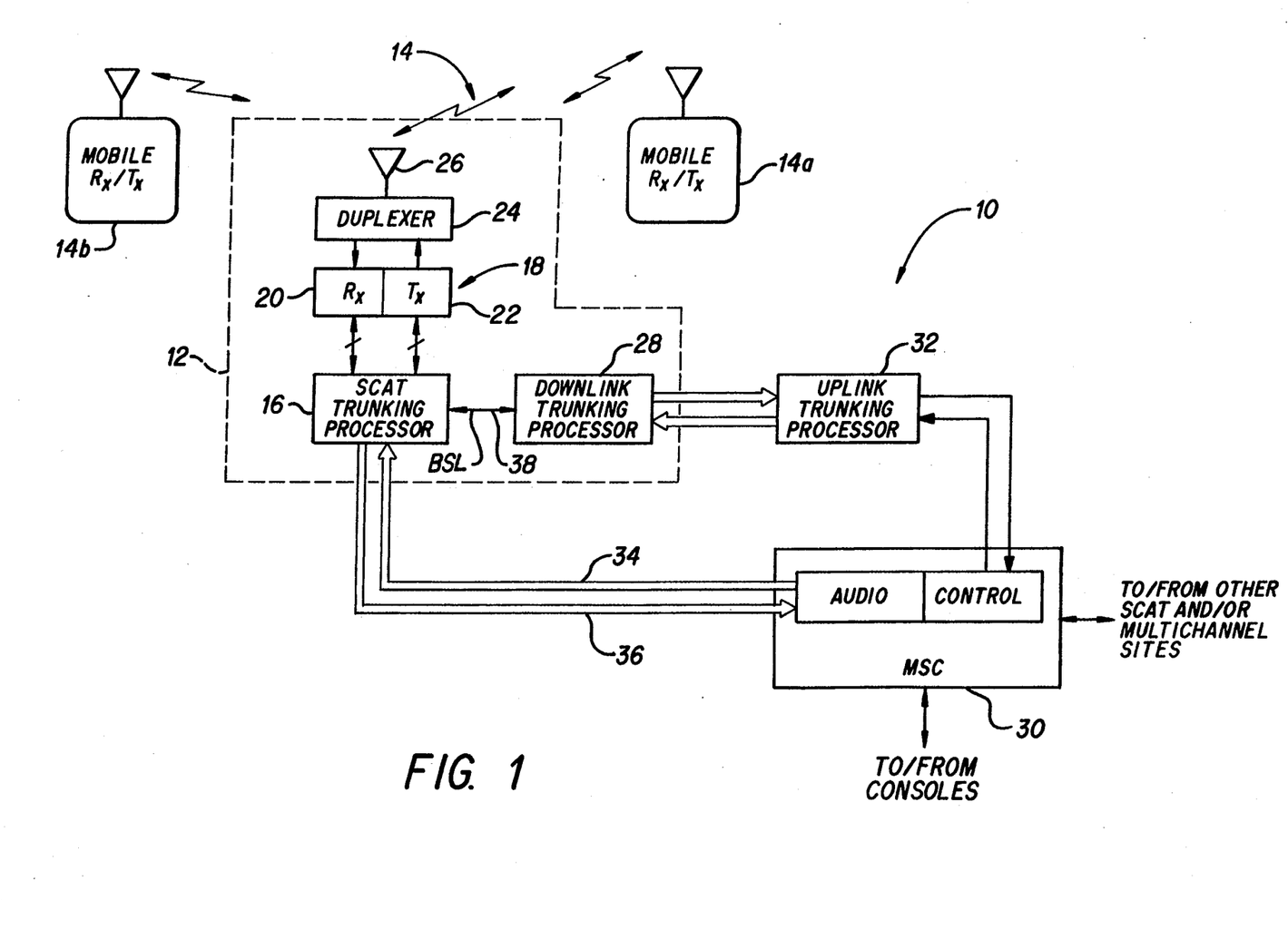
FIG. 1 is a block diagram of a presently preferred exemplary embodiment of a single channel autonomous trunking system provided by the present invention.

FIG. 1 is a schematic diagram of presently preferred embodiment of a single channel autonomous trunking ("SCAT") system 10 in accordance with the present invention. System 10 includes site equipment 12 and plural (typically many) mobile transceivers (hereafter "mobiles") 14. Mobiles 14 communicate with one another and with dispatchers via site equipment 12 over free space RF links 14.

Site equipment 12 includes, in a minimal configuration, a single "SCAT" processor 16; a full duplex RF repeater 18 comprising separate receiver 20 and transmitter 22; a duplexer 24; and an RF antenna 26. As is well known, receiver 20 and transmitter 18 provide a full duplex repeater function such that modulated RF signals received by receiver 20 are retransmitted by transmitter 18 on a different frequency (typically at higher effective radiated power) to provide increased coverage as compared to the coverage area of individual (typically lower power) mobiles 14. SCAT trunking processor 16 in the preferred embodiment includes a digital microprocessor that performs control and signal processing functions associated with the operation of repeater 18. Repeater 18 and trunking processor 16 in the preferred embodiment are conventional in design (except for the software controlling the processor 16) and may be of the type disclosed in the prior issued U.S. Pat. No. 4,905,302 Childress patent cited above. The SCAT trunking processor 16 is provided with appropriate program control instructions that enable it to perform the unique single channel autonomous trunking operations in accordance with the preferred embodiment of the present invention.

The preferred embodiment system 10 can work either as a single site system or as part of the standard EGE EDACS multi-site network environment. In the EDACS multi-site network environment, the manner in which site equipment 12 coordinates trunking activities closely resembles a normal EDACS failsoft (formerly called "SWEET 16") system in failsoft operation.

Thus site equipment 12 shown in FIG. 1 may further include a down link trunking processor 28 for communicating digital control information bi-directionally with a console and/or multi-site controller 30 via an uplink trunking processor 32 of standard design. Downlink trunking processor 28 and uplink trunking processor 32 may use standard EDACS signalling protocols as described in U.S. Pat. No. 4,835,731 to Nazarenko. Multi site controller 30 and/or a console may communicate audio signals to and from SCAT trunking processor 16 via audio links 34, 36. Multi-site controller 30 preferably comprises a conventional multi-site TDMA based switch of the type marketed by Ericsson-GE as described in pending patent application Ser. No. 07/658,798 entitled CONTROLLER ARCHITECTURE FOR RF TRUNKING DISTRIBUTED MULTISITE SWITCH filed on Feb. 22, 1991. Multi-site controller 30 provides interconnectivity between site equipment 12 and the site equipment of other single channel and/or multi-channel sites; and/or may provide connectivity with one or more dispatches consoles. In a more minimal configuration where interaction with other trunked sites is not required but interaction with one or more dispatch consoles is desired, multi-site controller 30 may be replaced with a dispatch console interface and associated consoles as is well known to those skilled in this art.

No central site controller/computer is needed in the preferred embodiment site equipment 12 implementation shown in FIG. 1 since trunking functions are performed by SCAT trunking processor 16. In the preferred embodiment, SCAT trunking processor 16 acts as the "control channel" trunking processor as described in patent application Ser. No. 07/532,164 of Childress et al., now U.S. Pat. No. 5,175,866. Thus, SCAT trunking processor 16 generates trunking control signals which it echoes over backup serial link 38 to downlink trunking processor 28. However, as mentioned above, in a more minimal configuration the downlink trunking processor 28 can be eliminated and the site equipment 12 may operate completely autonomously with single SCAT trunking processor 16 to provide intermobile RF communications.

Preferred embodiment site equipment 12 in accordance with the present invention implements a unique trunking technique with only a single channel as will now be described.

Briefly, when idle the site equipment 12 transmits control channel signalling like a standard "slotted aloha" EDACS control channel. Because of several operational differences between the preferred embodiment single channel system 10 and a typical multi-channel EDACS repeater site, a modified site ID message is transmitted by the site equipment 12 when in the control channel mode to identify itself as a SCAT channel.

When site equipment 12 receives a channel request from a mobile 14, it generates a channel assignment message as in a standard EDACS digitally trunked system. Site equipment 12 then ceases to operate as a control channel and begins to operate as an assigned channel. In a multi-channel EDACS digitally trunked configuration "channel update" messages indicating active calls are typically sent over the control channel while active communications are in progress over one or more assigned channels. Due to the fact that it is not possible to send such high speed channel updates over a single "SCAT" channel, site equipment 12 must ensure that transmitted channel assignments can be successfully detected by mobiles 14. To accomplish this, site equipment 12 transmits the channel assignments multiple times in order to increase the likelihood of detection. Following the last channel assignment transmission, site equipment 12 transitions from control signalling (control channel mode) to assigned signalling (assigned channel mode).

In the assigned mode, site equipment 12 operates with normal EDACS assigned channel signalling. Assigned signalling may be any type of signalling found on an assigned channel of an EDACS system working channel (e.g., clear voice, VOICE GUARD digitized voice, data, special call). The absence of a concurrently transmitting control channel results in the absence of channel update messaging capabilities that may create a problem with normal EDACS late entry. Suppose, for example, that one of mobiles 14 missed the original channel assignment control channel signalling associated with a particular call (e.g., because it was powered off or because it was monitoring another site). In a multichannel EDACS system having a dedicated control channel, channel update signalling would normally be sent on the control channel in order to provide for "late entry" into the ongoing communication. No such high speed updates over a dedicated control channel are possible in preferred embodiment "SCAT" system 10. A standard EDACS system sends subaudible data out over assigned channels for priority scan use. To provide a late entry capability, site equipment 12 in the assigned channel mode sends out a modified low speed data signal over the assigned channel which is monitored and used by mobiles 14 for late entry and wide area scanning purposes. Modified subaudible data is also used to prevent non-called mobiles 14 from unmuting their audio.

In the preferred embodiment a "SCAT" call is terminated in the same manner as a call is terminated in a conventional EDACS system. When an unkey or channel drop message is detected, "SCAT" site 12 sends a conventional EDACS working channel drop signalling sequence. Once the drop sequence is complete, site 12 reverts to operating in the control channel mode.

Mobiles 14 in the preferred embodiment do not send channel request messages during the time site 12 operates in the assigned channel mode, but instead wait until site operation reverts to the control channel mode. There is thus a possibility of overloading site 12 with channel request messages at the time the site reverts to the control mode. The preferred embodiment provides a call prioritization scheme which minimizes the adverse effects of such potential overloading. Upon reverting to the control channel mode, SCAT site 12 sends messaging which disables all mobile transmissions except for Emergency declarations (which can be transmitted immediately). Some time period (slots) later, site 12 transmits messaging which allows Emergency calls and certain routine mobile messaging (e.g., logins and status messages) but which continues to disable all other mobile transmissions. Still later (e.g., after 16 slot times), site 12 transmits further control channel messaging which allows all mobile transmissions.

Figure 2:
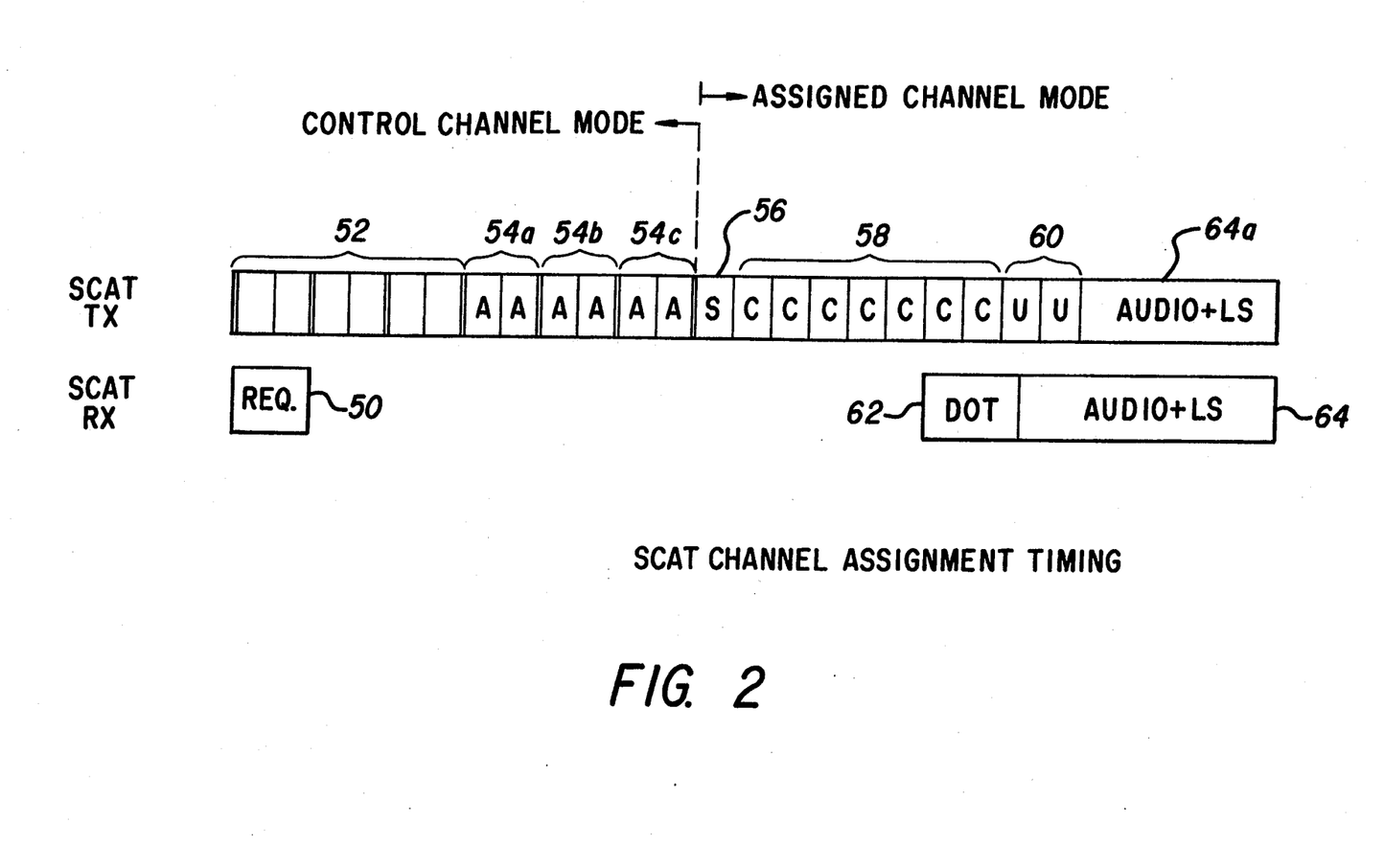
FIG. 2 is a schematic diagram of exemplary channel assignment signalling transmitted over the single channel.
Figure 3:
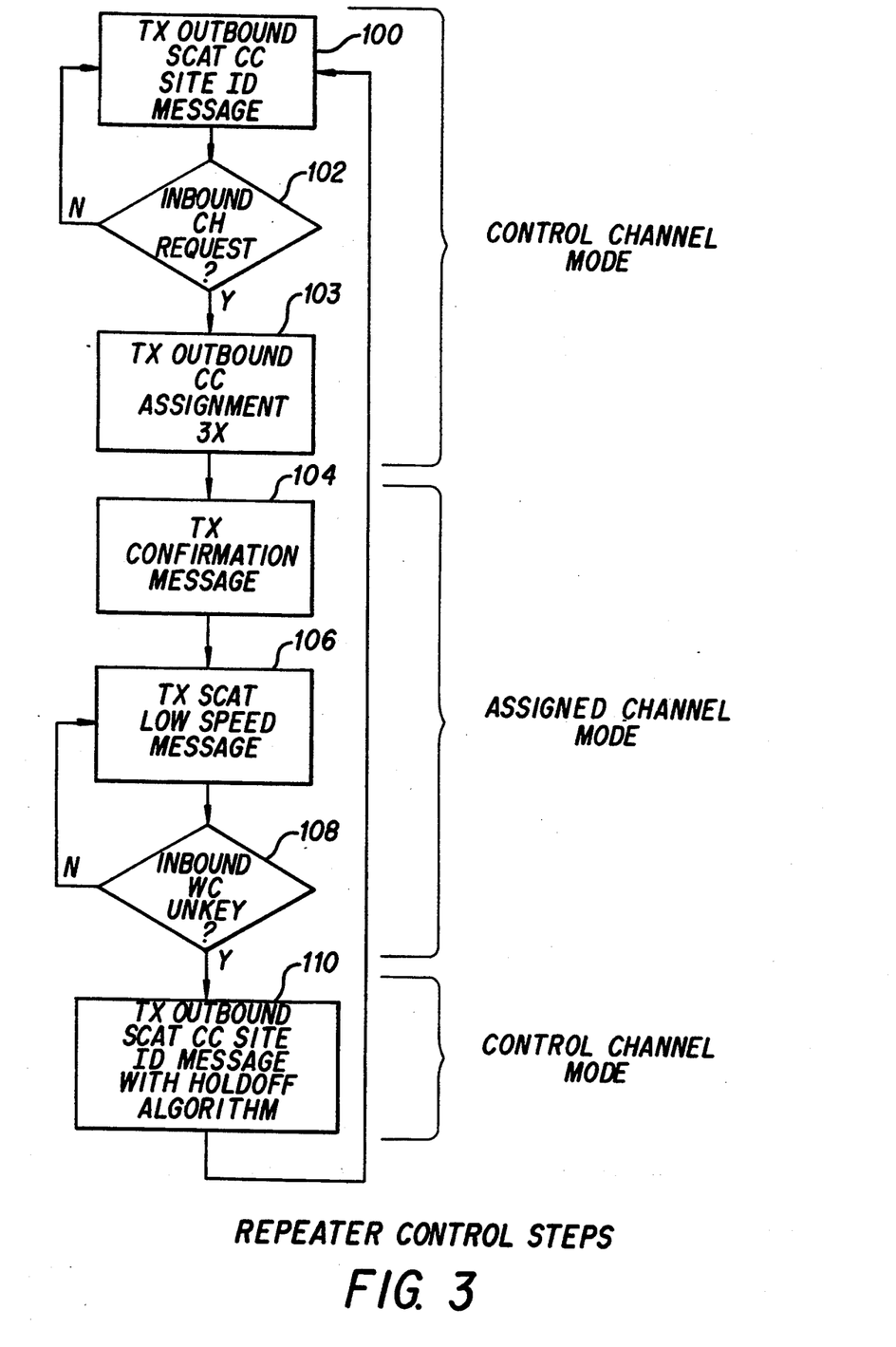
FIG. 3 is a flowchart of exemplary program control steps performed by the single channel repeater system shown in FIG. 1.
Figure 4:
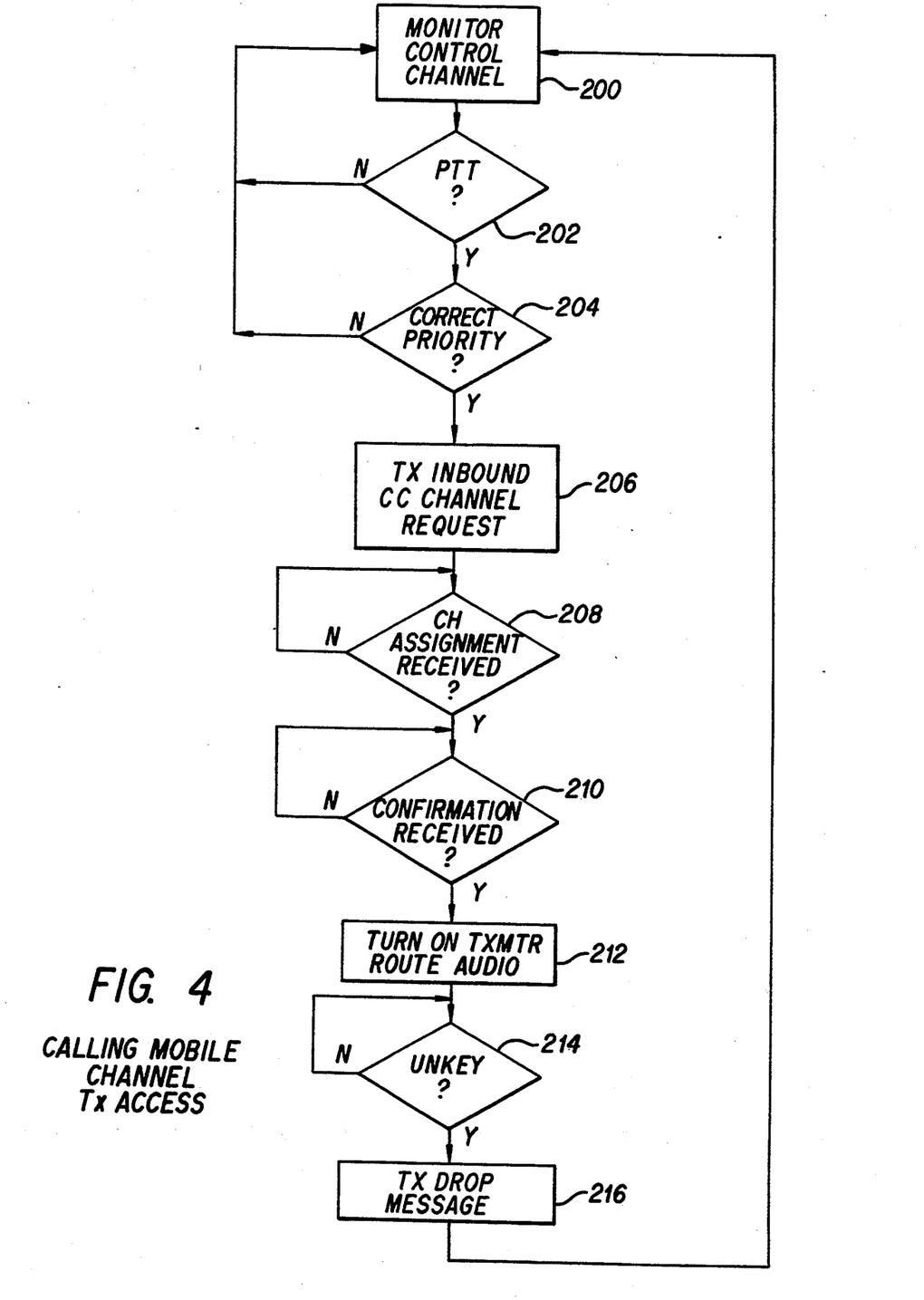
FIG. 4 is a flowchart of exemplary program control steps performed by the FIG. 1 mobile radio to request a channel assignment for transmission.
Figure 5:
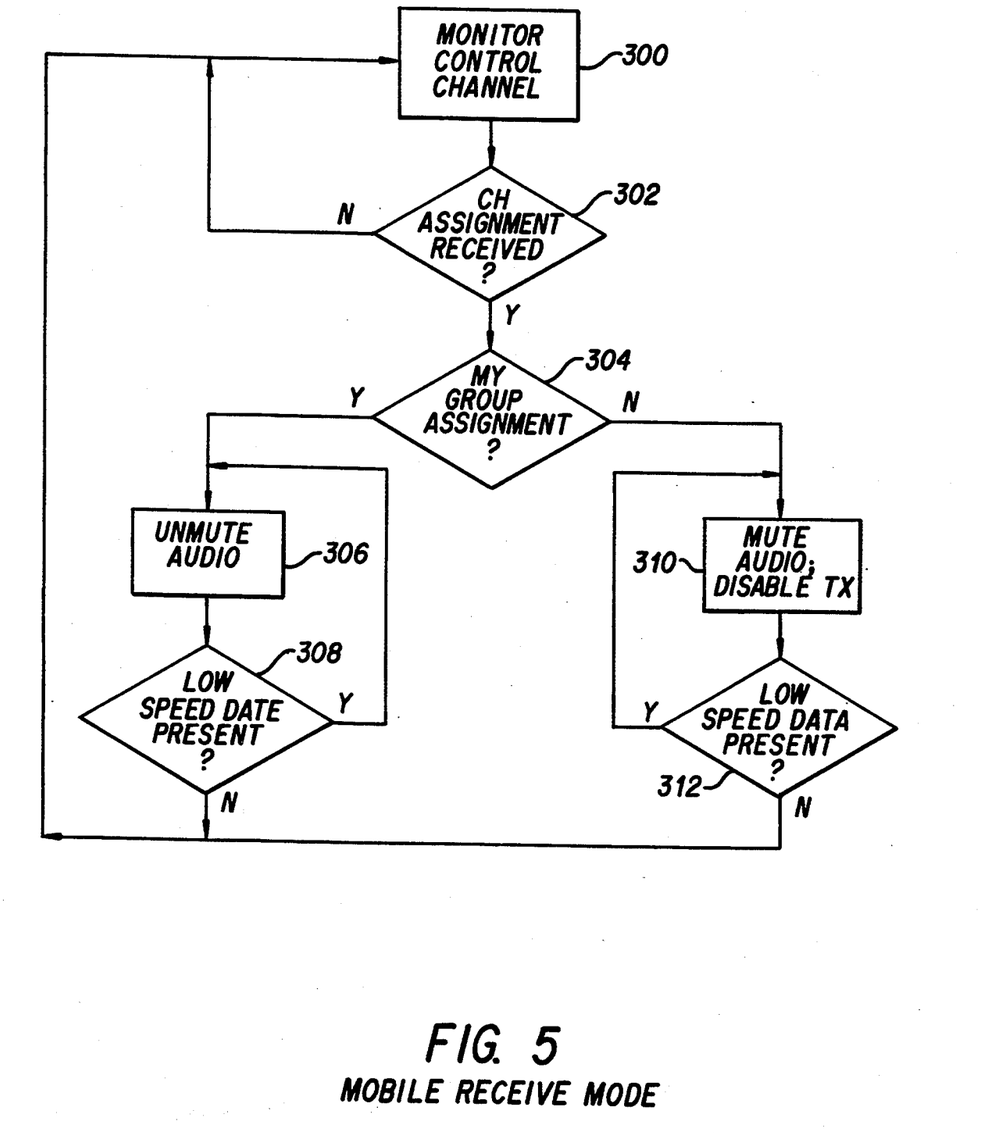
FIG. 5 is a flowchart of exemplary program control steps performed by the FIG. 1 mobile radio operating in the receive mode.

FIG. 2 is a timing diagram of exemplary channel acquisition signalling protocol within preferred embodiment system 10, and FIGS. 3–5 are flowcharts of exemplary program control steps performed by preferred embodiment site 12, a calling mobile 14a, and other mobiles (including a called mobile 14b), respectively, during channel acquisition. The top line in FIG. 2 shows signalling transmitted by repeater transmitter 18 to mobiles 14, and the bottom line in FIG. 2 shows signalling transmitted by a calling mobile 14 to repeater receiver 20.

During system idle, site 12 operates in the control channel mode and hence transmits control channel synchronization, site ID messaging (which identifies the site as a SCAT site), and other routine control channel signalling 52 (block 100, FIG. 3). Calling mobile 14 continually monitors such outbound control channel signalling 52 (block 200, FIG. 4). As in the prior art EDACS system, channel acquisition may begin with a push-to-talk (PTT) switch depression by the operator of calling mobile 14 (block 202, FIG. 4). Assuming the call is of a correct priority relative to the message priority currently authorized to be transmitted (decision block 204, FIG. 4), mobile 14 transmits a channel request message 50 over the inbound control channel (block 206, FIG. 4). Upon receiving channel request message 50 (block 102, FIG. 3), site 12 will grant the channel for temporary use by the calling (and specified called) mobiles by transmitting a responsive two-slot channel assignment message 52 (block 103, FIG. 3) two slots after the request is received. In the preferred embodiment, channel assignment message 54 is transmitted a total of three times (in addition to three-time-redundancy within each dual-slot message as provided in standard EDACS signalling) in order to increase the likelihood that all of mobiles 14 receive the message (block 208, FIG. 4; block 302, FIG. 5).

Calling mobile 14a may process the received channel assignment message 54 just as it would process a standard EDACs channel assignment message—that is, by retuning its frequency synthesizer to the assigned channel frequency. Since the assigned channel frequency and the control channel frequency are identical in the preferred SCAT system 10, no frequency retuning is actually required.

Site 12 now ceases operating in the control channel mode and begins to operate in the assigned channel mode. Such transition is performed in a manner which aligns the assigned signal timing relative to the control channel timing as would be seen by a normal EDACS mobile being assigned to an assigned channel in a plural channel trunked system including separate control and assigned channels (thus ensuring full compatibility). Site 12 first transmits a frame worth of synchronization signalling 56, and then transmits standard EDACS assigned channel confirmation signalling 58 (block 104, FIG. 3). Upon receiving such confirmation signalling, the calling mobile 14a transmits dotting 62 followed by subaudible data and audio (blocks 210, 212, FIG. 4). Site 12 receives the calling mobile's dotting 62 and generates two unmute messages 60 and then begins repeating received audio superimposed with the site generated subaudible data.

Meanwhile, all other mobiles 14 (including called mobile 14b) have been monitoring the control channel signalling 52 and receive the transmitted channel assignment message 54 (blocks 302, 304, FIG. 5). Each mobile 14 decodes the received channel assignment message 54 and determines whether the message specifies an individual or group ID the mobile is preprogrammed to respond to (block 304, FIG. 5). If the received channel assignment message 54 encodes a group that is not relevant to a particular mobile 14, the mobile mutes its audio, begins displaying a "busy" indication, and disables its ability to transmit while continuing to remain on the SCAT channel (block 310, FIG. 5). Called mobile 14b (whose group is specified by the channel assignment message 54) unmutes its audio after confirmation signalling 58, 60 is complete (block 306, FIG. 5) in order to receive the repeated transmission 64a of calling mobile 14a.

During assigned channel mode, SCAT site 12 transmits low speed data (block 106, FIG. 3) that is similar to low speed data transmitted on a multi-channel EDACS trunked system to provide a means of late entry (blocks 306, 308, FIG. 5).

A clear voice call is terminated in system 10 in generally the same manner that a clear voice call terminates in a standard EDACS system. When the operator of the calling mobile 14 releases PTT (decision block 214, FIG. 4), the mobile transmits a drop/unkey message to site 12 (block 216, FIG. 4). Site 12 receives this drop-/unkey message (block 108, FIG. 3) and transmits a typical EDACS assigned channel drop signalling sequence. Such channel drop signalling may also occur if the site 12 ceases to receive subaudible signalling from the calling mobile 14a for a predetermined time period. Once the channel drop sequence is complete, site 12 ceases operating in the assigned channel mode and reverts to control channel operating mode.

Operators of mobiles 14 other than the called or calling mobiles may depress PTT to request a channel assignment while site 12 operates in the assigned channel mode. Since such mobiles are unable to transmit during such time (block 310, FIG. 5), they alert their operator to this fact by generating a high-pitched "beep" which is normally used on a multichannel EDACS system to indicate to the user that he has been queued by the site. Such mobiles then start an initiate call timer. If the mobile 14 is unable to initiate a call before the initiate call timer times out, the radio will generate a "denied access" beep and return to normal SCAT operation.

Except when handling telephone calls, preferred embodiment site 12 always operates in a transmission trunked mode, but may provide a pseudo hang time for purposes of favoring channel reassignment to the mobiles that last used the channel (so as to provide pseudo message trunking capability). The pseudo hang time runs while site 12 is operating in the control channel mode and simply queues any mobile 14 or dispatcher requests until the pseudo hang time expires. This gives a particular group priority use of the channel while keeping the channel open for status, logins, and emergency requests. It also solves interference problems that may be associated with operating the channel in a true messaging trunked mode because it disallows mobiles from keying on top of one another. Finally, it provides flexibility in prioritizing calls by allowing site 12 to gracefully preempt pseudo message trunked calls to provide communications for higher priority calls.

Wide area scan is a major mobile related issue for SCAT operation. In multi-site wide area systems, mobiles 14 must lock onto SCAT channels and leave them at appropriate times. A mobile 14 receiving a control channel site ID message that identifies the transmitting site as a SCAT site begins using extended access time limits (e.g., 1.5 seconds) to compensate for the overall slower access time associated with a SCAT site. Radios entering a SCAT site 12 coverage area provide automatic login (as in a standard EDACS multisite system) but use the call prioritization scheme discussed above. If a mobile 14 sees a channel assignment directed to it before it has a chance to transmit its login message, it may respond to the call and open audio prior to a successful login, and then login after the SCAT channel site 12 reverts to control channel mode. Status messages operate in a similar fashion except that they are uniquely identified by site 12 and mobiles 14.

Once monitoring SCAT site 12, mobiles 14 must not automatically perform wide area scan (i.e., to search for another control channel) every time site 12 transitions to assigned channel mode. In the preferred embodiment a mobile will start scanning for another control channel if it loses high speed or low speed sync for a five second period. In the case of very long calls (e.g., interconnect calls) over SCAT system 10, non-called mobiles 14 may begin wide area scan for another control channel after a long delay time (e.g., 10–30 seconds) to reduce the chance that mobiles will be absent from a control channel for too long.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An RF repeater system for providing RF communications among plural mobile or portable radio transceivers, said system comprising a duplex RF repeater capable of simultaneously receiving and transmitting, said RF repeater operating alternately in a control channel mode and in an assigned channel mode, said RF repeater transmitting digital signalling including channel assignment signalling when operating in said control channel mode, said RF repeater repeating or regenerating mobile or portable radio transmissions and transmitting subaudible signalling control data for at least late entry purposes when operating in said assigned channel mode.

2. A method of communicating over a single RF channel comprising the following steps:
  when in a control channel operating mode, transmitting digital control signalling including a channel request message and a plurality of repetitive responsive channel assignment messages over said single channel to temporarily assign said single channel to at least one particular mobile or portable radio; and when in an assigned channel operating mode, transmitting assigned channel signalling over said single channel in response to said channel assignment messages.

3. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, further including the step of inhibiting a mobile or portable radio other than said assigned mobile or portable radio from transmitting on said single channel when in said assigned channel operating mode.

4. A method as in claim 2 further including reverting to said control channel operating mode upon termination of said temporary assignment.

5. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, further including reverting to said control channel operating mode upon termination of said temporary assignment;

further including inhibiting a mobile or portable radio from transmitting digital control channel signalling over said single channel during a hold-off time period subsequent to reverting to said control channel operating mode.

6. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, further including reverting to said control channel operating mode upon termination of said temporary assignment and controlling plural mobile or portable radios to transmit digital control channel signalling during different time periods following said reversion to minimize collisions over said single channel.

7. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, further including reverting to said control channel operating mode upon termination of said temporary assignment and reserving a time period following said reversion for emergency related transmissions.

8. A method as in claim 2 wherein said control channel signalling is time division multiplexed.

9. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, further including the step of redundantly transmitting said channel assignment message to increase the likelihood of detection by said mobile or portable radio.

10. A method of communicating over a single RF channel comprising the following steps:

when in a control channel operating mode, transmitting digital control signalling including a channel request message and a responsive channel assignment message over said single channel to temporarily assign said single channel to at least one particular mobile or portable radio; and when in an assigned channel operating mode, transmitting assigned channel signalling over said single channel in response to said channel assignment messages, and wherein said assigned channel signalling transmitting step includes transmitting low speed data for late entry purposes.

11. A method of upgrading a single channel RF repeater communications system to a plural channel RF repeater communications system without having to replace an installed base of mobile radios comprising:

converting a combined control and assigned channel repeater to operate alternately in a dedicated manner on a dedicated control channel or an assigned channel; and adding at least one further repeater for operation in a dedicated manner on said dedicated control channel or on said assigned channel.

12. A method of operating a wide area RF communications system comprising:

logging in, with a mobile, to a multichannel digitally trunked repeater site having a dedicated RF digital control channel and at least one further RF channel available for temporary assignment to mobiles; and subsequently logging in, with said same mobile, to a single channel digitally trunked repeater site having a single RF channel that operates alternately in a digital control channel mode and in an assigned channel mode.

13. A wide area RF communications system comprising:
- a multichannel digitally trunked repeater site having a dedicated RF digital control channel and at least one further RF channel available for temporary assignment to mobiles;
- a single channel digitally trunked repeater site having a single RF channel that operates alternately in a digital control channel mode and in an assigned channel mode; and
- a multisite switch that routes digital control messages to each of said multichannel site and said single channel repeater site.

14. An RF repeater including:
- an RF transmitter for transmitting RF signals over an output frequency;
- an RF receiver for receiving RF signals over an input frequency; and
- control means coupled to said RF transmitter and said RF receiver, said control means alternately: (a) controlling said transmitter to transmit and said receiver to receive digital control signalling to/from plural mobile radios; and (b) controlling said transmitter to transmit and said receiver to receive assigned channel signalling including low speed data signals to/from a subset of said plural mobile radios, said subset being specified by said digital control signalling.

15. A method of transmitting RF signals in accordance with a predetermined transmission signalling protocol, said method including:
- transmitting digital control signalling including a channel assignment message over an RF channel to temporarily assign said RF channel to at least one mobile radio; and
- transmitting assigned channel signalling included repeated or regenerated mobile transmissions and subaudible control data for at least late entry purposes over said assigned RF channel.

* * * * *